United States Patent Office 3,597,458
Patented Aug. 3, 1971

3,597,458
SUBSTITUTED N-1,2-DIPHENYLETHYL FATTY AMIDES AS CHOLESTEREMICS
Yasushi Nakamura, Ibaragi-shi, Michio Kimura, Minoo-shi, Yoshio Suzuki, Amagasaki-shi, Noritaka Hamma, Nishinomiya-shi, Toshitsugu Fukumaru, Kyoto, Shunji Aono, Toyonaka-shi, and Hideaki Fukushima, Nishinomiya-shi, Japan, assignors to Sumitomo Chemical Company, Ltd., Higashi-ku, Osaka, Japan
Continuation-in-part of application Ser. No. 794,038, Jan. 27, 1969. This application Apr. 25, 1969, Ser. No. 819,351
Claims priority, application Japan, Jan. 30, 1968, 43/5,910
Int. Cl. C09f 7/00
U.S. Cl. 260—404        42 Claims

ABSTRACT OF THE DISCLOSURE

Novel amide compounds having antiatherosclerosis actions which are represented by the formula:

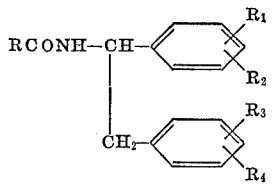

wherein R represents a $C_{15}$–$C_{25}$, straight chain or branched-chain, natural or synthetic, saturated or unsaturated aliphatic group having or not having hydroxyl group; $R_1$, $R_2$, $R_3$ and $R_4$ represent individually a hydrogen atom, a lower alkyl group, a lower alkoxy group or a halogen atom but cannot be hydrogen atoms at the same time.

The above-mentioned amide compounds can be used as drugs. They can be used by adding them to food-stuff additives such as butter and the like for preventing the deposition of cholesterol onto the walls of blood vessels.

---

This application is a continuation-in-part of U.S. Ser. No. 794,038 filed on Jan. 27, 1969 now abandoned.

This invention relates to novel amide compounds represented by the formula shown below, to a process for the preparation and to applications thereof.

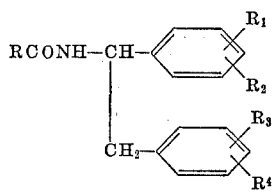

wherein R represents a $C_{15}$–$C_{25}$, straight chain or branched-chain, natural or synthetic, saturated or unsaturated aliphatic group having or not having hydroxyl group; $R_1$, $R_2$, $R_3$ and $R_4$ represent individually a hydrogen atom, a lower alkyl group, a lower alkoxy group or a halogen atom but cannot be hydrogen atoms at the same time.

An object of the present invention is to provide novel amide compounds, which are effective for prevention of hypercholesterolemia and atherosclerosis.

Another object is to provide a process for preparing said novel amide compounds.

A further object is to provide pharmaceutical compositions containing said novel amide compounds as active ingredients.

Fatty acid amide derivatives involved in the present invention have excellent cholesterol-lowering actions and preventing actions of atherosclerosis and, as the result of toxicity tests carried out for the past several years, it has been found that they have no undesirable acute and chronic toxicity.

The present compounds are used at a dosage of 0.1 g.–10 g./day for human beings. They are used with or without admixing with suitable carriers. It is preferable to apply in the form of capsule, tablet, powder etc.

Figure 1:
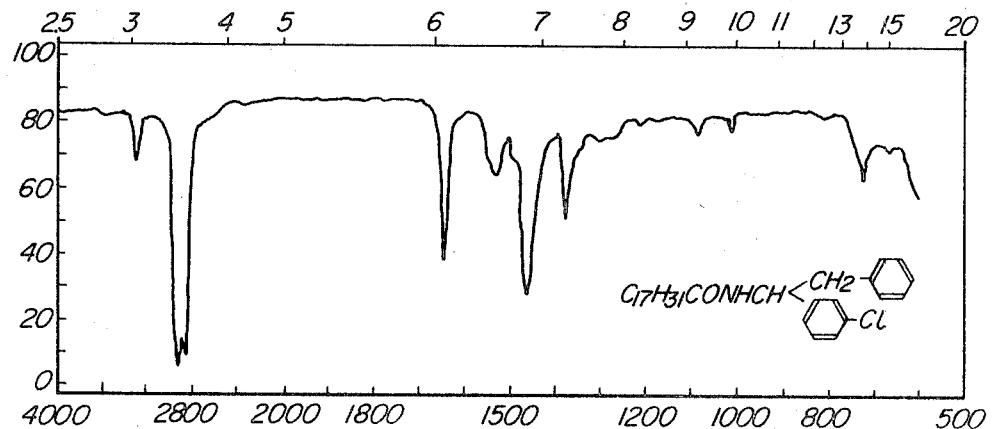
Figure 2:
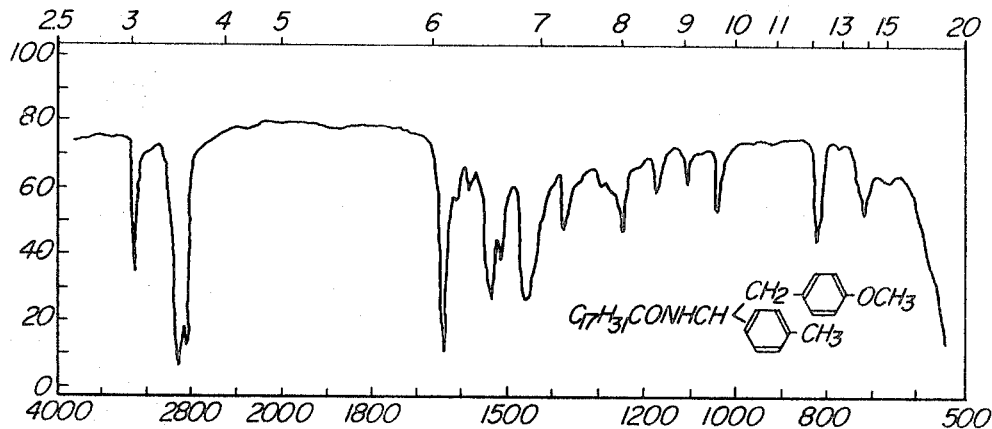
Figure 3:
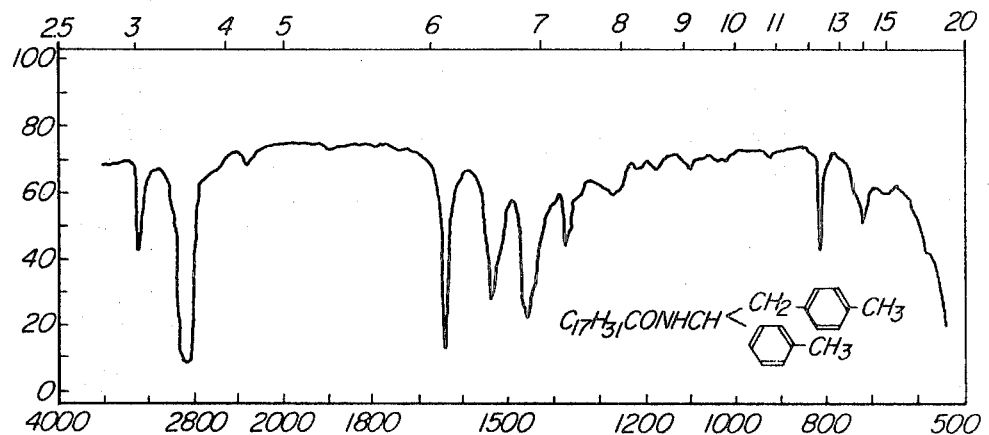
Figure 4:
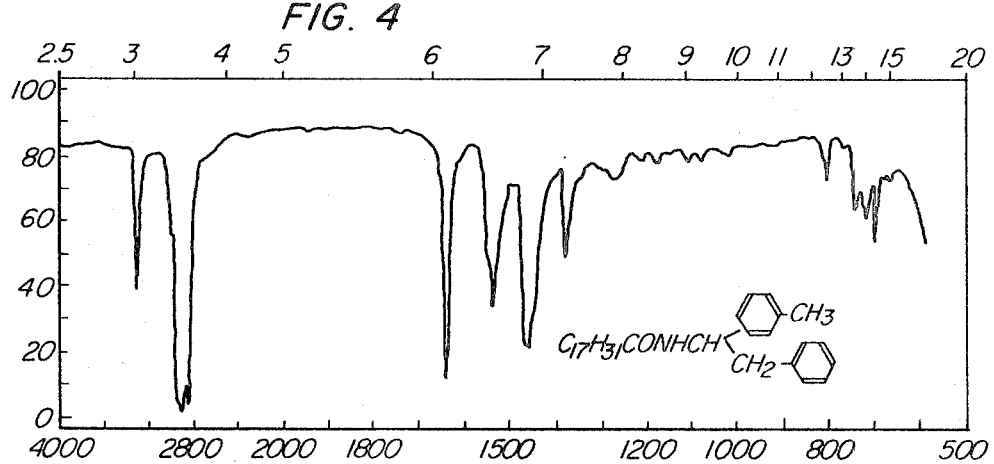

In the accompanying drawings, FIGS. 1 to 4 show infrared absorption spectra of several amide compounds obtained in accordance with the present invention.

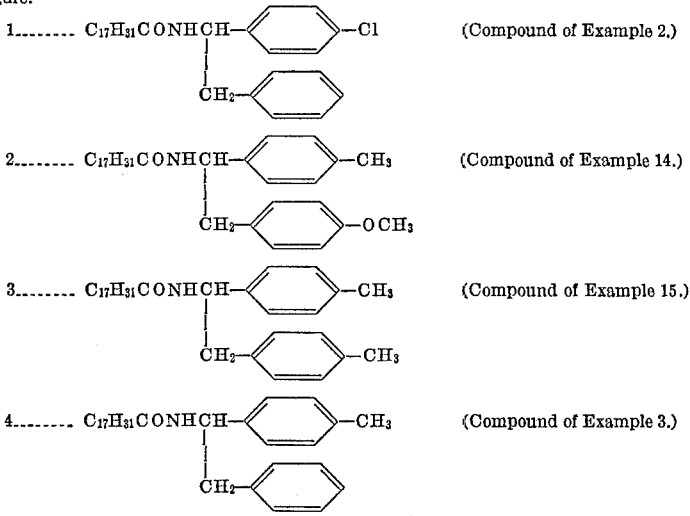

The fatty acids and reactive derivatives thereof which are involved in the present invention are saturated fatty acids such as palmitic, stearic, isostearic, arachidic, behenic, lignoceric, pentacosanoic and hexacosanoic acids; and unsaturated fatty acids such as palmitoleic, zoomaric, oleic, petroselinic, elaidic, vaccenic, gadoleic, erucic, brassidic, selacholeic, linoleic, linoelaidic, ricinoleic, eleostearic, linolenic, parinaric, eicosatetraenoic, arachidonic, eicosapentaenoic and docosapentanoic acids. These may be used either individually or in admixture. Fatty acids of the natural oils shown below, preferably liquid acids obtained from the said natural oils, reactive derivatives thereof and glycerides themselves may also be used. The natural oils include hemp-seed oil, linseed oil, perilla oil, oiticica oil, kaya oil, walnut oil, poppy-seed oil, safflower oil, watermelon-seed oil, soybean oil, sunflower oil, rice bran oil, pumpkin-seed oil, kaoliang oil, sesame oil, corn oil, rape oil, cottonseed oil, olive oil, cashew oil, tsubaki oil, ergot oil, castor oil, peanut oil, palm oil, palm kernel oil, coconut oil, beef tallow, lard, bone oil, horse fat, locust oil, chrysalis oil, shark oil, cuttlefish oil, sardine oil, mackerel oil, saury oil, herring oil, saurel oil, cod oil, trout oil, grey mullet oil, tunny oil, menuke oil, menhaden oil, eel oil, flatfish oil, whale oil, liver oil and residual oil. Further, the reactive derivatives include fatty acid halides, lower alkyl esters of fatty acids, and mixed acid anhydrides thereof with esters of chloroformic acid.

The amines employed in the present invention are benzylbenzylamines in which at least one phenyl group has been substituted by a lower alkyl group such as a methyl, ethyl, n-propyl, i-propyl, n-butyl, i-butyl or t-butyl group; a lower alkoxy group such as a methoxy, ethoxy, n-propoxy, i-propoxy, n-butoxy, i-butoxy or t-butoxy group; or a halogen atom such as a fluorine, chlorine, bromine or iodine atom, either independently or in admixture. These amine compounds can be synthesized by a process disclosed in, for example, "Organic Synthesis," Bound Number, vol. II, page 318 or 503, or "Journal of American Chemical Society," vol. 68, page 1866 (1946).

Further, the above amine may be resolved into optical isomers according to a method described in, for example, "Journal für Praktische Chemie," vol. 101, page 296 (1921), whereby desired optically active amines can be obtained in high yields. These optically active amines are also usable for preparation of the present amide derivatives.

The amide derivatives of the present invention are prepared by reacting a fatty acid represented either by the formula

$$RCOA \qquad (II)$$

wherein R is as mentioned previously; and A is a hydroxyl group, a lower alkoxy group or a halogen atom, or by the formula

(III)

wherein R is as mentioned previously; and $R_5$ is a lower alkoxy group, or a reactive derivative thereof or a glyceride containing said fatty acid, with a benzylbenzylamine derivative represented by the general formula

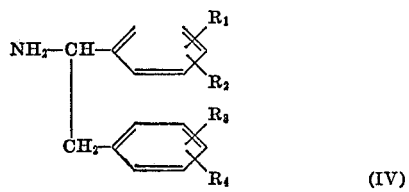

(IV)

wherein $R_1$, $R_2$, $R_3$ and $R_4$ are as mentioned previously.

Modes of practice of the above reaction are explained below.

(1) DI-SUBSTITUTED CARBODIIMIDE METHOD

In this method, a di-substituted carbodiimide is used as a dehydrating agent for said acid and amine. As the di-substituted carbodiimide, there may be used diisopropylcarbodiimide, dicyclohexylcarbodiimide, diphenylcarbodiimide or the like. Of these, however, dicyclohexylcarbodiimide is most commonly employed.

According to this method, said fatty acid, di-substituted carbodiimide and amine are individually dissolved in an inert solvent. Subsequently, the three solutions are mixed together under stirring at room temperature or below, and the mixed solution is allowed to stand at room temperature for several hours to several ten hours, whereby the reaction is complete.

In the above reaction, di-substituted urea is formed from said di-substituted carbodiimide. When recovered and dehydrated, the di-substituted urea can be regenerated to, and reused as, the di-substituted carbodiimide. Therefore, it can be said that this method is quite economical.

(2) THERMAL DEHYDRATION METHOD

According to this method, said fatty acid is charged with an equimolar or excess amount of the amine and the mixture and condensed by dehydration. The reaction mixture is heated at 100–300° C. for several hours to several ten hours. In the above reaction, an acid catalyst such as boric acid may be used if necessary, whereby the reaction time can be shortened in some cases.

(3) CATALYTIC DEHYDRATION METHOD

This method is carried out in the following manner:

The aforesaid fatty acid and amine are dissolved in a suitable solvent. To this solution is added such a dehydrating agent as sulfuric acid, p-phenolsulfonic acid, p-toluenesulfonic acid, p-toluenesulfonic acid chloride, or an anion or cation exchange resin (e.g. IRA–400, IR–50, IR–120, or Amberlyst 15, 21, 26 or 27). Subsequently, the solution is heated using a water-separator to remove water formed. Thereafter, the solvent is removed and the resultant is purified, whereby a desired product can be obtained in a markedly high yield and in a simple manner. Alternatively, the object can be achieved by merely heating said acid and amine together with a dehydrating agent in a tertiary organic amine such as pyridine, picoline or lutidine as the solvent.

(4) ACID HALIDE METHOD

As the fatty acid halide, any of chlorides, bromides and iodides of the aforesaid fatty acids may be used. Of these, the chloride is the most important fatty acid halide and can be prepared according to an ordinary procedure.

This method is carried out by dissolving or suspending the benzylamine derivative and an alkaline condensing agent in a suitable solvent, and adding drop by drop fatty acid halides to the said solution or the suspension.

(5) AMINOLYSIS METHOD

This method may be carried out in such a manner that a glyceride or lower alkyl ester of fatty acid is mixed with an equimolar amount to about 10 moles of the aforesaid substituted benzylbenzylamine derivative and the mixture is reacted at an elevated temperature. If necessary, the reaction may be effected in the presence of an inrt organic solvent. The reaction time is ordinarily 20–200 hours at below the boiling point of the amine. In order to save the reaction time, however, the reaction is effected in an autoclave to maintain the reaction temperature at above the boiling point of the amine, or methyl, ethyl or propyl alcohol eliminated during the reaction at atmospheric pressure is removed out of the reaction system. Alternatively, a small amount of a basic catalyst is added if necessary to the reaction system, or an alcohol or aqueous solution of the catalyst is added to the reactants, whereby the reaction time may be greatly shortened.

(6) MIXED ACID ANHYDRIDE METHOD

This method is carried out by reacting at a low temperature the aforesaid substituted benzylbenzyamine derivative with a mixed acid anhydride of chloroformate ester with fatty acid.

It is needless to say that all the amide synthesis methods other than those mentioned above can be utilized in the present invention.

According to the researches of the present inventors, it has been clarified that all the amides obtained by the above methods have excellent biological activities which, in animal tests using mice, rats and rabbits, markedly lower the blood and liver cholesterol thereof, greatly prevent the formation of atheromata on arterial walls, and show no toxicity at all even when administered for a long period of time. These methods are usable in the case of optical active amines.

Toxicities and biological effects of the present amide derivatives are explained below.

A food high in cholesterol content is given to 10 mice per group. At the same time, 0.05% of each of the present amide derivatives is administered to the mice in admixture with said food. When the amounts of serum and liver cholesterol of the mice are measured after 10 days, it is understood that the mice have been greatly lowered in cholesterol. Of many cases tested, several typical cases are shown in the following table:

TABLE 1

| | Serum cholesterol (mg. percent) | Liver cholesterol (mg./100 g.) |
|---|---|---|
| Control (no substance added) | 394 | 2,840 |
| Linoleic acid | 361 | 3,225 |
| $C_{17}H_{29}CONH-CH(-C_6H_4-CH_3)-CH_2-C_6H_5$ 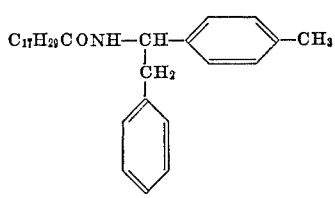 | 208 | 629 |
| $C_{17}H_{31}CONH-CH(-C_6H_5)-CH_2-C_6H_4-CH_3$ 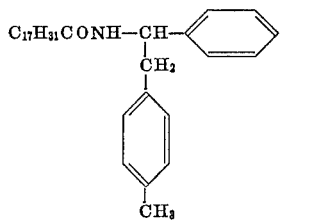 | 224 | 444 |
| $d\text{-}C_{17}H_{31}CONH-CH(-C_6H_5)-CH_3$ with $-C_6H_4-CH_3$ 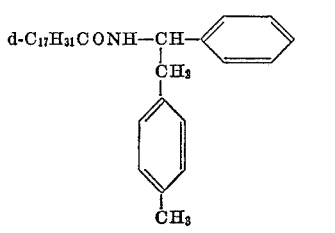 | 230 | 500 |
| $l\text{-}C_{17}H_{31}CONH-CH(-C_6H_5)-CH_2-C_6H_4-CH_3$ 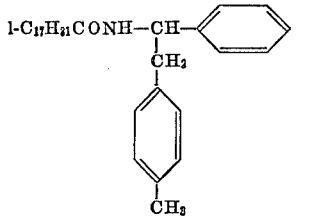 | 200 | 423 |
| $C_{17}H_{33}CONHCH(-C_6H_4-CH_3)-CH_2-C_6H_5$ 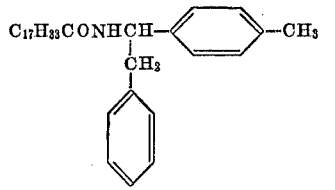 | 255 | 731 |
| $\text{iso-}C_{17}H_{35}CONH-CH(-C_6H_5)-CH_2-C_6H_3(CH_3)_2$ 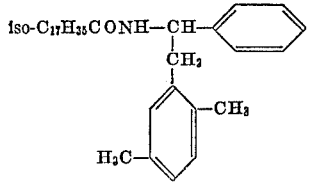 | 231 | 509 |

TABLE 1—Continued

| | Serum cholesterol (mg. percent) | Liver cholesterol (mg./100 g.) |
|---|---|---|
| Safflower oil-CO—NH—CH(—C6H4—CH3)—CH2—C6H4—CH3 | 218 | 475 |
| Linseed oil-CO—NH—CH(—C6H5)—CH2—C6H3(OCH3)(OCH3) | 259 | 763 |
| Cuttlefish oil-CO—NH—CH(—C6H5)—CH2—C6H4—CH3 | 213 | 531 |
| Sardine oil-CONHCH(—C6H4—C2H5)—CH2—C6H4—OCH3 | 221 | 507 |

Procedures for preparing the present amide derivatives are illustrated below with reference to examples.

EXAMPLE 1

To a solution of 4 g. of α-(p-methoxyphenyl)-β-phenylethylamine and 2.7 g. of triethylamine in 100 ml. of dry ether was added drop by drop a solution of 5.8 g. of linoleic acid chloride in 20 ml. of dry ether under stirring over a period of 1.5 hours at 20° C.

The mixed solution was stirred at said temperature for 2 hours and was then allowed to stand overnight at room temperature. Subsequently, the ether solution was refluxed for about 2 hours.

After completion of the reaction, the ether solution was washed with a 5% hydrochloric acid, water, a 5% sodium carbonate solution and water, in this order, and was then dried with anhydrous sodium sulfate. Thereafter, ether was removed by distillation to obtain 8 g. of N-[α-(p-methoxyphenyl)-β-phenylethyl]-linoleamide in the form of colorless paste.

*Elementary analysis.*—Calculated (percent): C, 80.92; H, 9.69; N, 2.86. Found (percent): C, 81.05; H, 10.05; N, 3.06.

EXAMPLE 2

To a solution of 10 g. of α-(p-chlorophenyl)-β-phenylethylamine and 4.6 g. of triethylamine in 150 ml. of dry ether was added drop by drop a solution of 13.5 g. of linoleic acid chloride in 20 ml. of dry ether under stirring over a period of 1.5 hours at 20° C.

Subsequently, the same operations as in Example 1 were effected to obtain 19 g. of N-[α-(p-chlorophenyl)-β-phenylethyl]-linoleamide in the form of colorless semisolid.

*Elementary analysis.*—Calculated (percent): C, 77.78; H, 8.98; N, 2.83; Cl, 7.18. Found (percent): C, 77.91; H, 8.88; N, 2.66; Cl, 6.92.

EXAMPLE 3

To a solution of 4 g. of α-(p-tolyl)-β-phenylethylamine and 2.9 g. of triethylamine in 100 ml. of dry ether was added drop by drop a solution of 6.3 g. of linoleic acid chloride in 20 ml. of dry ether under stirring over a period of 2 hours.

Subsequently, the same operations as in Example 1 were effected to obtain 7.3 g. of N-[α-(p-tolyl)-β-phenylethyl]-linoleamide in the form of colorless semisolid.

*Elementary analysis.*—Calculated (percent): C, 83.65; H, 10.01; N, 2.96. Found (percent): C, 84.34; H, 10.10; N, 3.23.

EXAMPLE 4

To a mixture of 1.1 g. of triethylamine, 50 ml. of ether and 4 g. of α-phenyl-β-(p-methoxyphenyl)-ethylamine was added drop by drop 3.3 g. of linoleic acid chloride at room temperature over a period of 1 hour. Thereafter, the mixture was stirred for 2 hours and allowed to stand overnight, and then refluxed for 1 hour. The reaction mixture was extracted with ether and the ether layer was washed with a 5% hydrochloric acid, a 5% sodium hydroxide solution and water, in this order, and was then dried.

Subsequently, the ether was removed by distillation to obtain desired N-[α-phenyl-β-(p-methoxyphenyl)-ethyl]-linoleamide in the form of white semisolid.

*Elementary analysis.*—Calculated (percent): C, 80.93; H, 9.67; N, 2.86. Found (percent): C, 81.32; H, 9.90; N, 2.27.

EXAMPLE 5

A mixture of 4 g. of α-(p-tolyl)-β-phenylethylamine and 5.3 g. of linoleic acid was heated at 180° C. for 72 hours while removing water formed. After completion of the reaction, the reaction mixture was dissolved in ether, and the ether solution was washed with alkali, acid and water, in this order, and then dried and concentrated to obtain 7.1 g. of a desired product in the form of semisolid.

*Elementary analysis.*—Calculated (percent): C, 83.65; H, 10.01; N, 2.96. Found (percent): C, 83.99; H, 10.09; N, 3.20.

EXAMPLE 6

A mixture of 4.7 g. of α-(p-ethylphenyl)-β-phenylethylamine and 5.8 g. of safflower oil was heated under stirring at 180° C. for about 70 hours. After completion of the reaction, the reaction mixture was treated in the same manner as in Example 5 to obtain 6.9 g. of a desired product in the form of semisolid.

EXAMPLE 7

A mixture of 7 g. of α-(p-bromophenyl)-β-(p,m-dichlorophenyl)-ethylamine and 5.8 g. of methyl ester of olive oil was stirred at 190° C. for about 80 hours while excluding methanol distilled out of the reaction system. After completion of the reaction, the reaction mixture was treated according to ordinary procedure to obtain 7.6 g. of a desired product in the form of semisolid.

EXAMPLE 8

A mixture of 2.3 g. of α-phenyl-β-(2,5-xylyl)-ethylamine, 2.8 g. of isostearic acid and 0.2 g. of p-toluenesulfonic acid was boiled for 12 hours in 100 ml. of xylene, using a water-separator. The reaction mixture was treated as usual manner to obtain 4.5 g. of white semisolid.

*Elementary analysis.*—Calculated (percent): C, 83.03; H, 10.86; N, 2.85. Found (percent): C, 83.22; H, 10.91; N, 2.70.

EXAMPLE 9

To a mixture of 4 g. of α-(p-tolyl)-β-phenylethylamine, 4.2 g. of dicyclohexylcarbodiimide and 50 ml. of toluene was added a mixture of 5.3 g. of oleic acid and 50 ml. of toluene. The resulting mixture was allowed to stand overnight at room temperature. Subsequently, deposited precipitates were removed by filtration, and excess dicyclohexylcarbodiimide was decomposed by addition of a small amount of acetic acid. Thereafter, the toluene layer was treated as usual manner to obtain 7.9 g. of a desired product in the form of semisolid.

*Elementary analysis.*—Calculated (percent): C, 83.31; H, 10.38; N, 2.94. Found (percent): C, 83.52; H, 10.55; N, 2.70.

EXAMPLE 10

A mixture of 2.4 g. of α-(p-tolyl)-β-(2,5-xylyl)-ethylamine, 2.9 g. of methyl isostearate and 0.3 g. of sodium methylate was stirred at 190 C. for about 10 hours. Subsequently, the reaction mixture was treated according to ordinary procedures to obtain 4.2 g. of a desired product in the form of semisolid.

*Elementary analysis.*—Calculated (percent): C, 83.11; H, 10.96; N, 2.77. Found (percent): C, 83.29; H, 11.11; N, 2.63.

EXAMPLE 11

To a solution of 14 g. of linoleic acid and 5,5 g. of triethylamine in 100 ml. of tetrahydrofuran was added drop by drop 5.9 g. of ethyl chloroformate under stirring at −10° C. to −5° C. Thereafter, the stirring was further continued at −5° C. for 30 minutes, and then a solution of 11 g. of α-(p-tolyl)-β-phenylethylamine in 20 ml. of tetrahydrofuran was added drop by drop under stirring at −5° C. Thereafter, the temperature was gradually elevated under stirring, and the mixture was stirred at 40° C. for additional 30 minutes. Subsequently, the tetrahydrofuran was removed by distillation and the residue was dissolved in ether. The ether solution was treated as usual manner to obtain 21.5 g. of white semisolid.

*Elementary analysis.*—Calculated (percent): C, 84.02; H, 9.62; N, 3.39. Found (percent): C, 84.31; H, 9.77; N, 3.20.

Other preparation examples of the present amide derivatives are tabulated below.

| Example | Compound obtained | Physical property | Calculated | | | | Found | | | |
|---|---|---|---|---|---|---|---|---|---|---|
| | | | C | H | N | Halogen | C | H | N | Halogen |
| 12 | $C_{17}H_{31}CONH-CH-CH_2-$ (phenyl with CH₃, CH₃ substituents) | Semisolid | 83.70 | 10.14 | 2.87 | | 83.48 | 10.18 | 3.07 | |
| 13 | $C_{17}H_{31}CONHCH-CH_2-$ (phenyl-Cl, with phenyl substituent) | Semisolid | 77.76 | 8.99 | 2.83 | 7.17 | 78.33 | 8.81 | 2.20 | 6.84 |
| 14 | $C_{17}H_{31}CONHCH-CH_2-$ (phenyl-OCH₃, with phenyl-CH₃ substituent) | M.P., 79–81° C. | 81.05 | 9.82 | 2.78 | | 81.22 | 9.98 | 2.76 | |

| Example | Compound obtained | Physical property | Analysis, percent |||||||| 
|---|---|---|---|---|---|---|---|---|---|---|
| | | | Calculated |||| Found ||||
| | | | C | H | N | Halogen | C | H | N | Halogen |
| 15 | C₁₇H₃₁CONHCH(−C₆H₄−CH₃)−CH₂−C₆H₄−CH₃ | M.P., 83–84.5° C. | 83.72 | 10.13 | 2.87 | ......... | 84.10 | 10.10 | 2.32 | ......... |
| 16 | C₁₇H₃₁CONHCH(−C₆H₅)−CH₂−C₆H₄−CH₃ | M.P., 81–83° C. | 83.67 | 10.00 | 2.96 | ......... | 83.32 | 9.88 | 2.67 | ......... |
| 17 | C₁₇H₃₁CONH−d−CH(−C₆H₄−CH₃)−CH₂−C₆H₅ | Semisolid | 83.65 | 10.01 | 2.96 | ......... | 83.94 | 10.11 | 3.03 | ......... |
| 18 | C₁₇H₃₁CONH−l−CH(−C₆H₄−CH₃)−CH₂−C₆H₅ | Semisolid | 83.65 | 10.01 | 2.96 | ......... | 83.90 | 10.90 | 3.17 | ......... |
| 19 | C₁₉H₃₁CONHCH(−C₆H₄−CH₃)−CH₂−C₆H₅ | Semisolid | 84.45 | 9.52 | 2.81 | ......... | 84.59 | 9.67 | 3.01 | ......... |
| 20 | C₁₅H₃₁CONHCH(−C₆H₅)−CH₂−C₆H₄−C₂H₅ | Semisolid | 82.88 | 10.65 | 3.02 | ......... | 83.03 | 10.83 | 3.14 | ......... |
| 21 | i-C₁₇H₃₅CONHCH(−C₆H₄−CH₃)−CH₂−C₆H₅ | Semisolid | 82.96 | 10.76 | 2.93 | ......... | 83.15 | 10.76 | 2.77 | ......... |

| Ex. | Compound obtained | Physical property |
|---|---|---|
| 22 | Linseed oil CONHCH(−C₆H₃(OCH₃)(OCH₃))−CH₂−C₆H₅ | Semisolid. |
| 23 | Rape oil CONHCH(−C₆H₄−CH₃)−CH₂−C₆H₄−CH₃ | Semisolid. |

| Ex. | Compound obtained | Physical properties |
|---|---|---|
| 24 | Safflower oil CONHCH—CH$_2$—C$_6$H$_4$—CH$_3$ (with C$_6$H$_4$-CH$_3$ substituent) | Semi-solid. |
| 25 | Corn oil CONHCH—CH$_2$—C$_6$H$_4$—OC$_2$H$_5$ (with phenyl substituent) | Semi-solid. |
| 26 | Cuttlefish oil CONHCH—CH$_2$—C$_6$H$_4$—CH$_3$ (with phenyl substituent) | Semi-solid. |
| 27 | Mackerel oil CONHCH—CH$_2$—C$_6$H$_5$ (with C$_6$H$_4$-F substituent) | Semi-solid. |
| 28 | Sardine oil CONHCH—CH$_2$—C$_6$H$_4$—C$_2$H$_5$ (with C$_6$H$_4$-OCH$_3$ substituent) | Semi-solid. |
| 29 | Flatfish oil CONHCH—CH$_2$—C$_6$H$_5$ (with C$_6$H$_4$-OC$_2$H$_5$ substituent) | Semi-solid. |
| 30 | Whale oil CONHCH—CH$_2$—C$_6$H$_4$—F (with C$_6$H$_4$-OCH$_3$ substituent) | Semi-solid. |
| 31 | Sesame oil CONHCH—CH$_2$—C$_6$H$_4$—C$_2$H$_5$ (with C$_6$H$_4$-OCH$_3$ substituent) | Semi-solid. |
| 32 | Cod oil CONHCH—CH$_2$—C$_6$H$_4$—CH$_3$ (with C$_6$H$_4$-CH$_3$ substituent) | Semi-solid. |
| 33 | Soybean oil CONHCH—C$_6$H$_5$ / CH$_2$—C$_6$H$_4$—CH$_3$ | Semi-solid. |

| Example | Compound obtained | Physical property | Calculated C | Calculated H | Calculated N | Found C | Found H | Found N |
|---|---|---|---|---|---|---|---|---|
| 34 | C$_{17}$H$_{31}$CONHCH—C$_6$H$_4$—CH(CH$_3$)$_2$ / CH$_2$—C$_6$H$_5$ | $n_D^{23.6}$ 1.5250 | 83.77 | 10.26 | 2.79 | 84.08 | 10.38 | 2.81 |
| 35 | C$_{17}$H$_{31}$CONHCH—C$_6$H$_4$—C(CH$_3$)$_3$ / CH$_2$—C$_6$H$_5$ | $n_D^{28.5}$ 1.5300 | 83.82 | 10.36 | 2.72 | 83.83 | 10.45 | 2.76 |
| 36 | C$_{17}$H$_{31}$CONHCH—C$_6$H$_5$ / CH$_2$—C$_6$H$_4$—CH$_3$ | M.P., 50–51° C | 83.67 | 10.00 | 2.96 | 83.59 | 9.86 | 2.86 |
| 37 | (+)C$_{17}$H$_{31}$CONHCH—C$_6$H$_5$ / CH$_2$—C$_6$H$_4$—CH$_3$ | $\alpha_D$ +18.0, M.P., 80–82° C. | 83.67 | 10.00 | 2.96 | 83.80 | 10.23 | 2.88 |

| Example | Compound obtained | Physical property | Analysis, percent |||||| 
|---|---|---|---|---|---|---|---|---|
| | | | Calculated ||| Found |||
| | | | C | H | N | C | H | N |
| 38 | 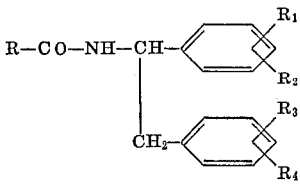 (-)$C_{17}H_{31}CONHCH$-...  $CH_2$-...-CH | $\alpha_D$ -17.8, M.P., 81-83° C. | 83.67 | 10.00 | 2.96 | 83.77 | 9.94 | 3.06 |
| 39 | 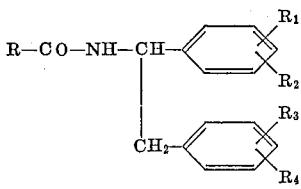 $\gamma$-$C_{17}H_{29}CONHCH$-... $CH_2$-...-$CH_3$ | Semisolid | 84.02 | 9.62 | 2.97 | 83.88 | 9.49 | 3.13 |
| 40 | 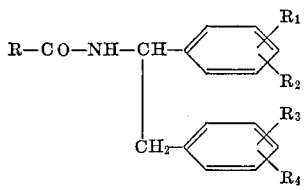 $C_{17}H_{33}CONHCH$-... $CH_2$-...-$CH_3$ | do | 8.31 | 10.38 | 2.96 | 83.21 | 10.15 | 3.10 |

What we claim is:

1. An amide derivative represented by the formula,

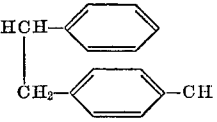

wherein R represents a $C_{15}$–$C_{25}$ alkyl or alkenyl group which may be substituted by a hydroxyl and $R_1$, $R_2$, $R_3$ and $R_4$ represent individually a hydrogen atom, a lower alkyl group, a lower alkoxy group or a halogen atom, but cannot be hydrogen atoms at the same time.

2. An amide derivative represented by the formula,

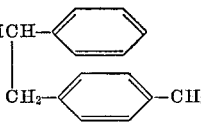

wherein R represents a $C_{15}$–$C_{25}$ alkyl or alkenyl group and $R_1$, $R_2$, $R_3$ and $R_4$ represent individually a hydrogen atom, a lower alkyl group, a lower alkoxy group or a halogen atom, but cannot be hydrogen atoms at the same time.

3. An amide derivative represented by the formula,

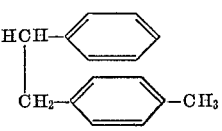

wherein R represents a $C_{15}$–$C_{25}$ alkyl or alkenyl group which may be substituted by a hydroxyl, $R_1$ is a lower alkyl group, a lower alkoxy group or a halogen atom and $R_2$, $R_3$ and $R_4$ represent individually a hydrogen atom, a lower alkyl group, a lower alkoxy group or a hydrogen atom.

4. An amide derivative represented by the formula,

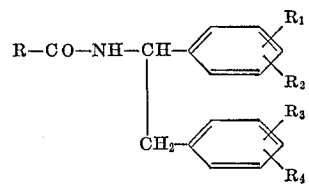

wherein R represents a $C_{15}$–$C_{25}$ alkyl or alkenyl group which may be substituted by a hydroxyl, $R_3$ is a lower alkyl group, a lower alkoxy group or a halogen atom and $R_1$, $R_2$ and $R_4$ represent individually a hydrogen atom, a lower alkyl group, a lower alkoxy group or a halogen atom.

5. N - [α - (p-methoxyphenyl)-β-phenylethyl]-linoleamide.
6. N-[α-(p-chlorophenyl)-β-phenylethyl]-linoleamide.
7. N-[α-(p-tolyl)-β-phenylethyl]-linoleamide.
8. N - [α - phenyl-β-(p-methoxyphenyl)-ethyl]-linoleamide.
9. α-(p-ethylphenyl)-β-phenylethylamide of safflower oil fatty acid.
10. α - (p-bromophenyl)-β-(p,m-dichlorophenyl)-ethylamide of olive oil fatty acid.
11. N-[α-phenyl-β-(2,5-xylyl)-ethyl]-isostearamide.
12. N-[α-(p-tolyl)-β-phenylethyl]-oleamide.
13. N-[α-(p-tolyl)-β-(2,5-xylyl)-ethyl]-isostearamide.
14. N-[α - (2,5 - dimethylphenyl)-β-phenylethyl]-linoleamide.
15. N - [α - phenyl-β-(p-chlorophenyl)-ethyl]-linoleamide.
16. N - [α - (p-tolyl)-β-(p-methoxyphenyl)-ethyl]-linoleamide.
17. N-[α-(p-tolyl)-β-(p-tolyl)-ethyl]-linoleamide.
18. N-[α-phenyl-β-(p-tolyl)-ethyl]-linoleamide.
19. N-[(d)-α-(p-tolyl)-β-phenylethyl]-linoleamide.
20. N-[(l)-α-(p-tolyl)-β-phenylethyl]-linoleamide.
21. N-[α-(p-tolyl)-β-phenylethyl]-arachidonamide.
22. N - [α - phenyl-β-(p-ethylphenyl)-ethyl]-palmitamide.
23. N-[α-(p-tolyl)-β-phenylethyl]-isostearamide.
24. α-(4,5 - dimethoxyphenyl)-β-phenylethylamide of linseed oil fatty acid.
25. α-(p-tolyl)-β-(p-tolyl)-ethylamide of rape oil fatty acid.

26. α-(p-tolyl)-β-(p-tolyl)-ethylamide of safflower oil fatty acid.
27. α-phenyl-β-(p-ethoxyphenyl)-ethylamide of corn oil fatty acid.
28. α-phenyl-β-(p-tolyl)-ethylamide of cuttlefish oil fatty acid.
29. α-(p-fluorophenyl)-β-phenylethylamide of mackerel oil fatty acid.
30. α - (p - ethoxyphenyl)-β-(p-ethylphenyl)-ethylamide of sardine oil fatty acid.
31. α-(p-ethoxyphenyl)-β-phenylethylamide of flatfish oil fatty acid.
32. α-phenyl-β-(p-fluorophenyl)-ethylamide of whale oil fatty acid.
33. α - (p - methoxyphenyl)-β-(p-ethylphenyl)-ethylamide of sesame oil fatty acid.
34. α-(p-tolyl)-β-(p-tolyl)-ethylamide of cod oil fatty acid.
35. α-phenyl-β-(p-tolyl)-ethylamide of soybean oil fatty acid.
36. N - [α - (p-isopropylphenyl)-β-phenylethyl]-linoleamide.
37. N - [α - (p-t-butylphenyl)-β-phenylethyl]-linoleamide.
38. N-[α-phenyl-β-(o-tolyl)-ethyl]-linoleamide.
39. (+)N-[α-phenyl-β-(p-tolyl)-ethyl]-linoleamide.
40. (−)N-[α-phenyl-β-(p-tolyl)-ethyl]-linoleamide.
41. (γ)-N-[α-phenyl-β-(p-tolyl)-ethyl]-linoleamide.
42. N-[α-phenyl-β-(p-tolyl)-ethyl]-oleamide.

References Cited

UNITED STATES PATENTS

| | | | |
|---|---|---|---|
| 2,503,285 | 4/1950 | McPhee | 260—570.5 |
| 2,506,588 | 5/1950 | Goodson et al. | 260—570.5 |
| 3,193,458 | 7/1965 | Shapiro et al. | 424—320 |
| 3,253,006 | 5/1966 | Davis | 260—404 |

FOREIGN PATENTS

| | | | |
|---|---|---|---|
| 1,051,286 | 12/1966 | Great Britain | 260—404 |
| 1,057,742 | 2/1967 | Great Britain | 260—404 |
| 1,123,004 | 8/1968 | Great Britain | 260—404 |

LEWIS GOTTS, Primary Examiner

G. HOLLRAH, Assistant Examiner

U.S. Cl. X.R.

424—320; 260—570.5R